United States Patent
Murto

(10) Patent No.: US 10,656,783 B2
(45) Date of Patent: May 19, 2020

(54) VARIABLE HEIGHT TERRAIN SURFACE

(71) Applicant: Thomas Nicholas Murto, Spokane, WA (US)

(72) Inventor: Thomas Nicholas Murto, Spokane, WA (US)

(73) Assignee: Thomas Nicholas Murto, Spokane, WA (US)

( * ) Notice: Subject to any disclaimer, the term of this patent is extended or adjusted under 35 U.S.C. 154(b) by 0 days.

(21) Appl. No.: 16/506,847

(22) Filed: Jul. 9, 2019

(65) Prior Publication Data

US 2020/0097155 A1 Mar. 26, 2020

Related U.S. Application Data

(63) Continuation of application No. 16/136,941, filed on Sep. 20, 2018, now Pat. No. 10,466,855.

(51) Int. Cl.

| | |
|---|---|
| *G06F 3/0481* | (2013.01) |
| *A63F 13/212* | (2014.01) |
| *A63F 13/214* | (2014.01) |
| *A63F 13/217* | (2014.01) |
| *G02B 27/01* | (2006.01) |

(52) U.S. Cl.
CPC ........ *G06F 3/04815* (2013.01); *A63F 13/212* (2014.09); *A63F 13/214* (2014.09); *A63F 13/217* (2014.09); *G02B 27/017* (2013.01)

(58) Field of Classification Search
None
See application file for complete search history.

(56) References Cited

U.S. PATENT DOCUMENTS

| | | | |
|---|---|---|---|
| 10,466,855 B1 | 11/2019 | Murto | |
| 2009/0111670 A1* | 4/2009 | Williams | A63B 23/0464 482/146 |
| 2012/0295764 A1* | 11/2012 | Brammer | A63B 24/0087 482/9 |
| 2018/0036880 A1* | 2/2018 | Stephens, Jr. | A63B 22/0023 |
| 2018/0157317 A1* | 6/2018 | Richter | G06F 3/011 |
| 2019/0134457 A1* | 5/2019 | Chen | G06F 3/011 |

OTHER PUBLICATIONS

"Non-Final Office Action", U.S. Appl. No. 16/136,941, filed Jun. 7, 2019, 12 pages.
"Notice of Allowance", U.S. Appl. No. 16/136,941, filed Jul. 22, 2019, 9 pages.

* cited by examiner

*Primary Examiner* — Ke Xiao
*Assistant Examiner* — Jed-Justin Imperial
(74) *Attorney, Agent, or Firm* — SBMC

(57) ABSTRACT

A variable height terrain surface is leveraged in connection with provision of a virtual reality (VR) environment. In one or more implementations, a variable height terrain surface includes a plurality of height adjusting units that are individually adjustable to simulate a terrain described by terrain data. A controller, that is communicably coupled to the variable height terrain surface, maps the terrain described by the terrain data to the height adjusting units. Additionally, the controller causes the height adjusting units to adjust (e.g., vertically) based on the mapping.

20 Claims, 7 Drawing Sheets

VARIABLE HEIGHT TERRAIN SURFACE

CLAIM OF PRIORITY

This application is a continuation of and claims priority to U.S. patent application Ser. No. 16/136,941, filed Sep. 20, 2018, entitled "Variable Height Terrain Surface", the entire disclosure of which is hereby incorporated by reference herein in its entirety.

BACKGROUND

Virtual reality (VR) systems allow users to view and interact with virtual worlds. However, conventional systems are limited in their ability to simulate a physical experience corresponding to a virtual world. For example, conventional systems for providing a physical experience are limited to providing a flat surface for the user even though the virtual world as viewed through a VR headset may include varying surfaces or objects. These surfaces or objects displayed through the VR headset may include, for instance, varying surfaces of a terrain (e.g., slopes, curbs, unevenness), obstacles in the terrain (e.g., stairs, fallen trees, boulders), materials comprising the terrain (e.g., sand or pavement), and so forth. The flat surface provided by conventional techniques fails to convey the physical experience associated with such terrain elements. As such, there is a disconnect, in conventional systems, between what a user views through VR displays and the user's physical experience. Thus, even as technology to generate the visual representation continues to increase in complexity, this disconnect prevents users from becoming fully immersed within the virtual environment.

SUMMARY

To overcome these problems, a variable height terrain surface is leveraged in connection with provision of a virtual reality (VR) environment. In one or more implementations, a variable height terrain surface includes a plurality of height adjusting units that are individually adjustable to simulate a terrain described by terrain data. A controller, that is communicably coupled to the variable height terrain surface, maps the terrain described by the terrain data to the height adjusting units. Additionally, the controller causes the height adjusting units to adjust (e.g., vertically) based on the mapping.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTIONS OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
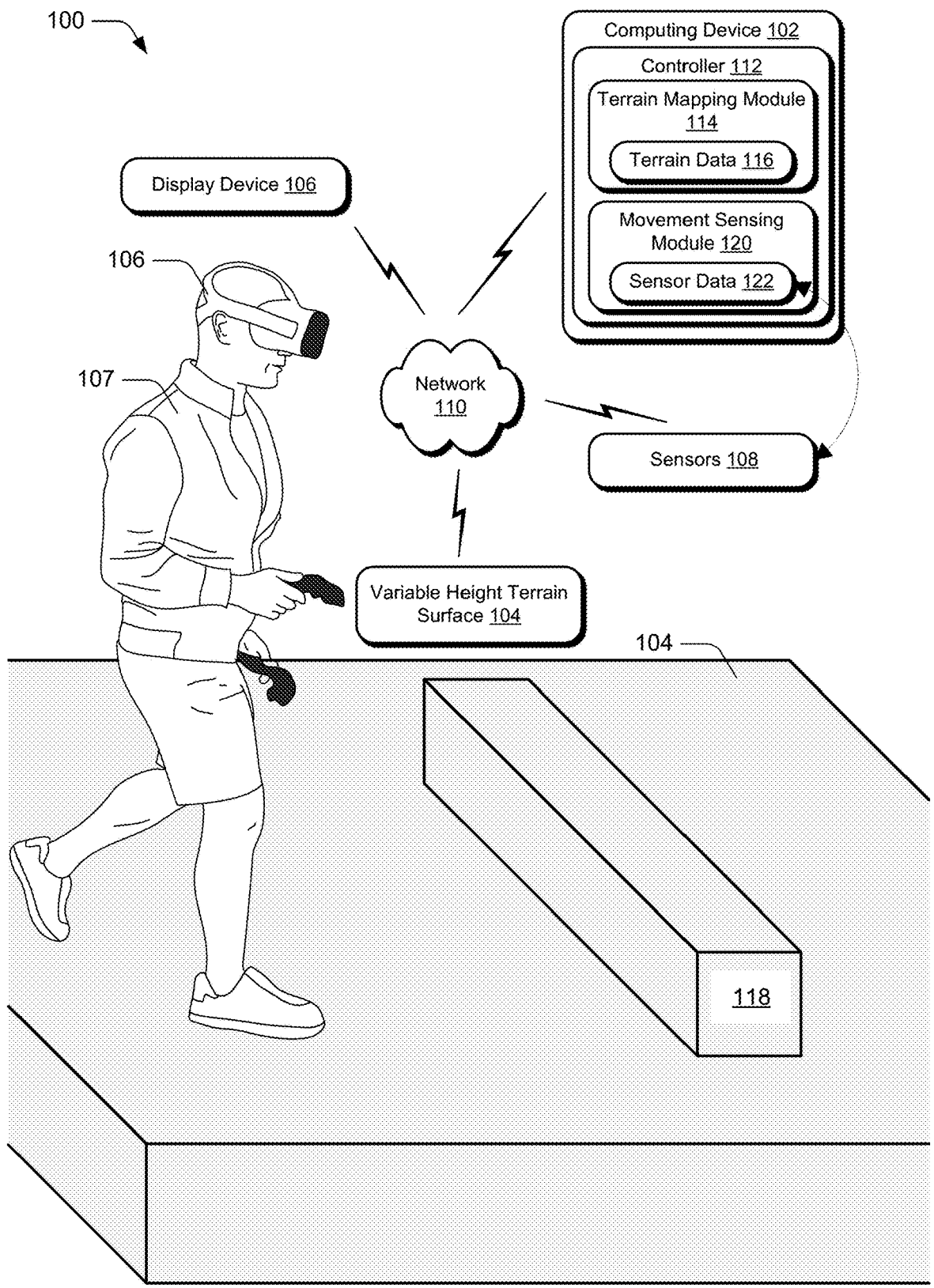
FIG. 1 is an illustration of an environment in an example implementation that is operable to employ techniques herein.

Virtual reality (VR) systems allow users to view and interact with virtual worlds. However, conventional systems are limited in their ability to simulate a physical experience corresponding to a virtual world. For example, conventional systems for providing a physical experience are limited to providing a flat surface for the user even though the virtual world as viewed through a VR headset may include varying surfaces or objects. These surfaces or objects displayed through the VR headset may include, for instance, varying surfaces of a terrain (e.g., slopes, curbs, unevenness), obstacles in the terrain (e.g., stairs, fallen trees, boulders), materials comprising the terrain (e.g., sand or pavement), and so forth. The flat surface provided by conventional techniques fails to convey the physical experience associated with such terrain elements. As such, there is a disconnect, in conventional systems, between what a user views through VR displays and the user's physical experience. Thus, even as technology to generate the visual representation continues to increase in complexity, this disconnect prevents users from becoming fully immersed within the virtual environment.

To overcome these problems, a variable height terrain surface is leveraged. The variable height terrain surface is controlled to adjust to simulate terrain elements of a virtual world. Broadly speaking, the virtual world is described by terrain data, which a controller processes to determine a mapping of the terrain of the virtual world. Based on this mapping, the controller adjusts the variable height terrain surface to conform to the terrain of the virtual world. By way of example, the controller can control the variable height terrain surface to adjust height and frictions, at multiple different positions, so that the terrain a user physically experiences is consistent with the virtual world visually experienced, e.g., through display via a VR display device. Doing so eliminates the disconnect between what a user views through a VR display device and the physical experience, thereby allowing the user to become fully immersed in the virtual world.

In one or more implementations, the variable height terrain surface includes multiple height adjusting units, e.g., arranged in a grid. For instance, the controller can cause the height adjusting units to extend or retract to different heights corresponding to the terrain. By way of example, each height adjusting unit may include a piston element that is vertically adjustable to a respective height based on the terrain data. The piston element includes fixed and extendable portions, where the fixed portion is secured to a layer of the variable height terrain surface and the extendable portion is extendable and retractable from the fixed portion. In some cases, the height adjusting unit includes a friction element, disposed at an extendable end of the piston, that is rotatable in six degrees of freedom. The controller can adjust the height of the piston element to simulate a profile of terrain elements as well as adjust friction of the friction element to simulate characteristics of the terrain, such as the materials comprising the terrain, e.g., sand, pavement, ice, and so forth.

Consider an example in which the controller receives terrain data indicating a certain friction associated with a terrain. In this example, the controller communicates instructions to one or more of the friction elements effective to adjust how resistive the friction elements are to rotation. By adjusting how resistive the friction elements are to rotation, the controller controls the friction elements to simulate the surface friction of the terrain. The friction elements rotate in six degrees of freedom, which allow the user to move (e.g., walk or run) omni-directionally on the variable height terrain surface—unlike a traditional treadmill which are designed to facilitate movement in a single direction (e.g., forward). As a user moves, for instance, the friction elements are configured to rotate in a direction opposite the user's movement. By moving in this opposite direction, the friction elements keep the user substantially centered on the variable height terrain surface. Unlike conventional systems, though, the variable height terrain surface also allows a user to experience vertical changes in the terrain.

The variable height terrain surface may be implemented as a platform to enable a user to move through the virtual environment by moving on the variable height terrain surface, such as by walking or running. For example, when the user takes a step on the variable height terrain surface, the step is detected and used to propel the user through the virtual world. To this end, the controller is further configured to adjust the variable height terrain surface as the user moves through the virtual environment. In connection with doing so, the controller receives sensor data from various sensors, such as sensors included as part of the variable height terrain surface (e.g., pressure sensors) and other sensors communicably coupled to the controller (e.g., cameras). Based on this sensor data, the controller is able to determine movement of the user in relation to the variable height terrain surface and map this movement to movement through the virtual environment. As the user moves on the variable height terrain surface, for example, the controller adjusts a position of the user in the virtual world. The controller then adjusts both the variable height terrain surface (e.g., by adjusting the height adjusting units) to conform to the changing position, as well as the virtual environment viewed through the VR display. In this way, the user's physical experience with the variable height terrain surface remains consistent with the user's visual experience with the VR display while the user physically moves (e.g., walking or running) on the variable height terrain surface.

Further discussion of these and other examples is included in the following sections and shown in corresponding figures.

Example Environment

FIG. 1 is an illustration of an environment 100 in an example implementation that is operable to employ techniques herein. The illustrated environment includes a computing device 102, a variable height terrain surface 104, a display device 106, and sensors 108 which are communicatively coupled, one to another, via a network 110.

The computing device 102 may be implemented using a variety of different types of computing devices in a variety of different configurations. A computing device, for instance, may be configured as a desktop computer, a laptop computer, a mobile device (e.g., assuming a handheld configuration such as a tablet or mobile phone), worn by a user as goggles or other eyewear, and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown by way of example, the computing device may be representative of a plurality of different devices, such as multiple servers utilized by a business to perform operations "over the cloud."

The computing device 102 may be further configured to connect to additional computing devices over the network 110. For example, these additional computing devices may provide functionality via the network relating to provision of services such as, but not limited to, gaming services, virtual reality event services, virtual reality tour services, fitness services, shopping services, entertainment services, and so forth.

In example 100, the display device 106 is illustrated as a virtual reality (VR) headset which provides an immersive experience to the user 107 by rendering virtual images for viewing by the user based on a virtual terrain. However, the display device 106 may also be implemented as various different types of display devices which render 2D and/or 3D images for display. In one example, the display device may be implemented as a 2D display which renders 2D images to the user 107 for viewing. Although a VR headset is illustrated, any suitable 2D or 3D display may be leveraged, such as, but not limited to, a television screen, a computer monitor, a mobile computing device, a projector, virtual reality or augmented reality glasses/goggles, and so forth.

The computing device 102 is further illustrated as including a controller 112. The controller 112 is implemented at least partially in hardware of the computing device 102, e.g., a processing system and computer-readable storage medium. Broadly speaking, the controller 112 represents functionality to control the variable height terrain surface 104 and the display device 106.

In the illustrated example, the controller 112 includes a terrain mapping module 114, which receives terrain data 116 describing a terrain of one or more virtual environments. The controller 112 controls the variable height terrain surface 104 based on the terrain data 116. In accordance with the described techniques, for instance, the controller controls a plurality of height adjusting units of the variable height terrain surface 104 to simulate the terrain described by the terrain data 116. For example, if the terrain includes a terrain element 118 (e.g., stairs) described by the terrain data 116, the terrain mapping module 114 will cause the plurality of height adjusting units to vertically adjust to simulate the stairs of the terrain. As described throughout, the terrain mapping module 114 is further configured to synchronize the terrain simulated by the variable height terrain data with the virtual environment displayed by the display device 106.

In the illustrated example, the controller 112 further includes a movement sensing module 120 which performs operations in conjunction with the terrain mapping module 114. The movement sensing module 120, for instance, receives sensor data 122, from sensors 108, describing a position and movement of the user relative to the variable height terrain surface 104. The sensor data 122 may be received via a wired or wireless connection between the movement sensing module 120 and the sensors 108. The sensor data 122 is usable by the movement sensing module 120 to predict a future position and movement of the user 107 relative to the terrain simulated by the variable height terrain surface 104 and displayed by display device 106. Thus, the terrain mapping module 114 also updates the variable height terrain surface 104 based on sensor data 122.

In one or more implementations, the sensor data 122 describes positioning or movement of a user relative to the variable height terrain surface 104. Examples of different types of the sensors 108 include, by way of example and not limitation, cameras, thermal sensors, infrared sensors, accelerometers, proximity sensors, and so on. Other types of sensors leveraged in connection with the described system may include pressure sensors configured to detect pressure applied by the body of the user 107 (e.g., the user's feet) contacting portions of the variable height terrain surface 104.

The controller 112 is further configured to control the display of the terrain via the display device 106 such that the terrain simulated by the variable height terrain surface 104 is synchronized with the displayed terrain. In this way, the user 107's physical experience with the variable height terrain surface 104 remains consistent with the visual experience provided via the display device 106. By way of example, if the terrain includes a terrain element 118 (e.g., stairs), then as the representation of the stairs on the variable height terrain surface 104 approaches the user 107 a visual display provided by the display device 106 also simulates stairs approaching the user 107. To this end, the visual display provided by the display device 106 acts as a visual cue that enables the user 107 to interact with the changing terrain provided by the variable height terrain surface 104, e.g., by stepping up onto stairs, jumping over a fallen tree, moving around a boulder, or accounting for unevenness or sloping of the terrain.

In one or more implementations, multiple users 107 may be active in a same virtual world provided by the described techniques. For example, multiple users 107 may interact with the same virtual world, each via respective variable height terrain surfaces 104 and display devices 106. In this way, the multiple users can interact, such as in connection with multi-player games, class-based learning experiences, virtual meetings, and so forth. These different variable height terrain surfaces 104 and display devices 106 may be communicatively coupled, one to another, e.g., via the network 110, to enable such group experiences.

Figure 2:
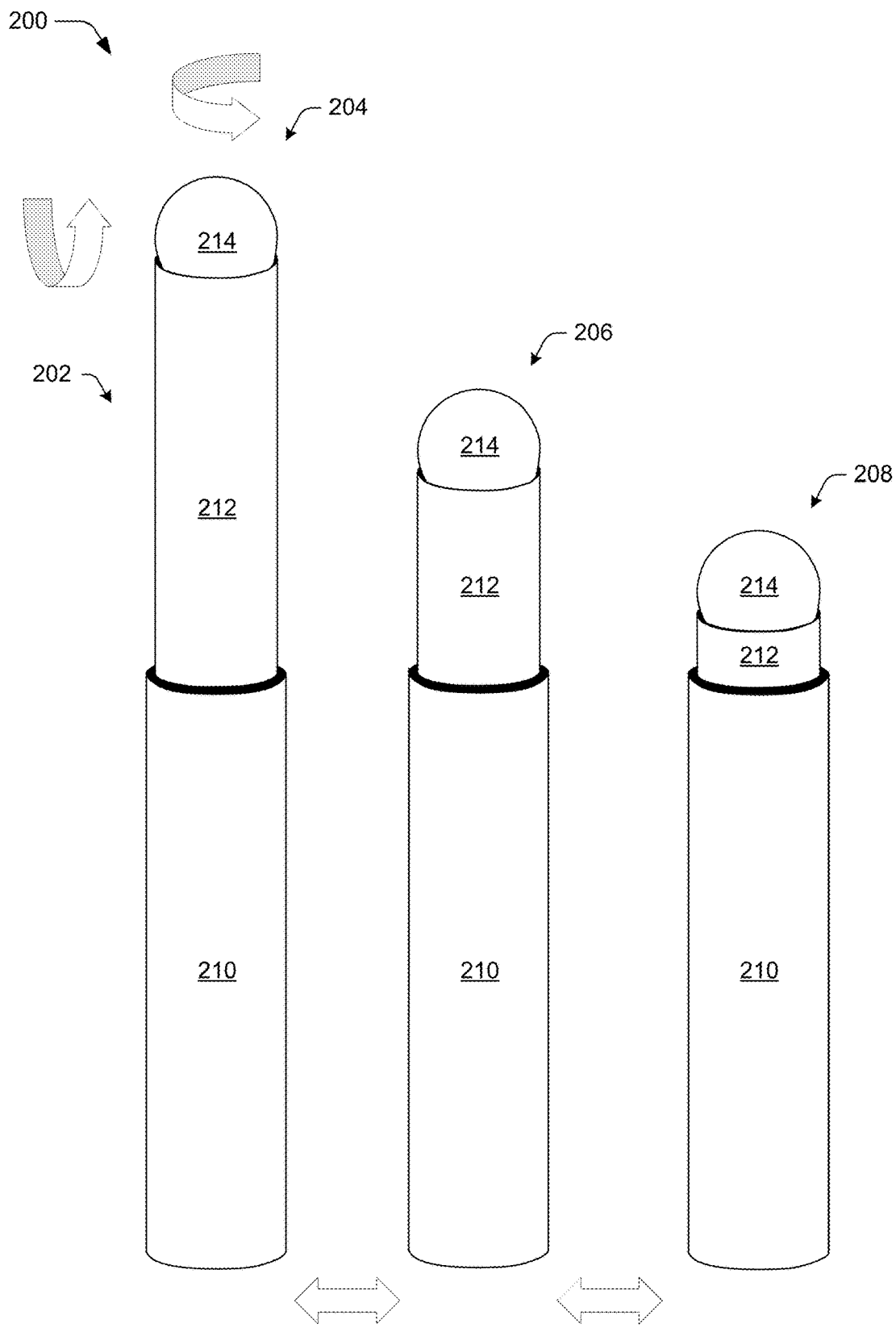
FIG. 2 depicts an example implementation of a single height adjusting unit of the variable height terrain surface of FIG. 1 at three different stages.

FIG. 2 depicts an example implementation 200 of a single height adjusting unit of the variable height terrain surface 104 of FIG. 1 at three different stages. In particular, the illustrated example 200 depicts height adjusting unit 202 at stages 204, 206, 208 representing heights at which the height adjusting unit 202 can be extended or retracted.

In this example 200, the height adjusting unit 202 is depicted in a piston configuration, including a fixed portion 210, an extendable portion 212, and a friction element 214. The extendable portion 212 is vertically extendable and retractable from the fixed portion 210, which may be physically secured to a layer of the variable height terrain surface 104.

As described throughout, a plurality of these height adjusting units 202 are disposed on the variable height terrain surface 104 proximate one another such that a flat surface is simulated when all of the height adjusting units 202 are disposed at a same height, e.g., all fully extended, all fully retracted, and so forth.

Each height adjusting unit 202 is configured to adjust responsive to instructions received from the controller 112. Notably, the height adjusting units 202 may adjust independently from one another to simulate the terrain. Such adjusting can include extending or retracting of the extendable portion 212 in relation to the fixed portion 210 to adjust height. For example, if the terrain data 116 describes terrain that requires the extendable portion 212 of the height adjusting units 202 to extend, then the extendable portions 212 of the height adjusting units 202 is controlled so that it extends from the fixed portion 210 at approximately the height described by the terrain data 116. Alternatively, if the terrain data 116 describes terrain that requires the extendable portion 212 of the height adjusting units 202 to retract, then the extendable portion 212 is controlled so that it retracts into the fixed portion 210 at approximately the height described by the terrain data 116.

The extendable portion 212 may extend or retract in any number of ways. By way of example, the extendable portion 212 may be extended or retracted using pneumatics, hydraulics, or any other suitable technique without departing from the spirit or scope of the techniques described herein. The piston element may be manufactured from a variety of different materials. For example, the piston elements may be manufactured from various metals such as, but not limited to, aluminum, steel, stainless steel, or titanium. Additionally, the piston element may comprise plastic components or be made completely of any suitable plastic such as, but not limited to, polyvinyl chloride (PVC), polypropylene (PP), or acrylonitrile butadiene styrene (ABS).

The above-noted adjusting of the height adjusting units 202 also includes modifying the rotatability of the friction element 214, causing the friction element 214 to rotate more or less easily. As illustrated, the friction element 214 may be disposed at an extendable end of the height adjusting unit 202, e.g., the extendable portion 212, and may be rotatable in six degrees of freedom.

In one or more implementations, the friction element 214 can be controlled to adjust based on characteristics of the terrain described by the terrain data 116. For example, if the terrain data 116 describes terrain having a characteristic of being slippery, then the friction element 214 can be controlled so that its rotatability is increased thereby simulating a slippery surface. If the terrain data 116 instead describes terrain having a characteristic of being non-slippery, e.g., dry pavement or concrete, then the friction element 214 can be controlled so that its rotatability is decreased to simulate the non-slippery surface.

Additionally, the friction element 214 is configured to rotate, at least partially in an opposite direction of the movement of the user 107 based on sensor data 122 describing position and movement of the user 107. Doing so, generally keeps the user 107 within a predefined distance of a center of the variable height terrain surface 104. For example, if the user 107 runs on the variable height terrain surface 104, the rotation of the friction element 214 is controlled to keep the user proximate the center, e.g., the rotatability is increased relative to the rotatability allowed for a running user, the friction element 214 is controlled to actively rotate in a direction opposite the user 107's movement to reposition the user proximate the center, and so forth. For example, if sensor data 122 describes that a user 107 is at a center position moving at Speed Y in Direction Z, then at least a portion of friction elements 214 may rotate in a direction opposite of direction Z, such that when the user 107 steps on the portion of friction elements 214, the user 107 is returned to the center position. Thus, the user 107 may move freely throughout the virtual world without running into obstacles.

The friction element 214 can be implemented in a variety of different ways to adjust rotation. By way of example, the friction element 214 may include one or more magnetic elements that magnetically couple the friction element 214 to the extendable portion 212 of the height adjusting unit 202. In this scenario, the controller 112 may provide instructions to increase the magnetic force associated with one or more friction elements 214 causing the one or more friction elements 214 to be more resistive to rotation, thereby increasing the friction. Conversely, the controller 112 may provide instructions to decrease the magnetic force associated with one or more friction elements 214 causing the one or more friction elements 214 to be less resistive to rotation, thereby decreasing the friction. Although the friction elements 214 are described as being controlled using magnetic forces, the friction elements 214 may be implemented in a variety of other ways without departing from the spirit or scope of the described techniques.

Additionally, while the height adjusting unit of FIG. 2 is depicted having a fixed portion 210, extendable portion 212, and friction element 214, the height adjusting unit 202 may be implemented in a variety of different ways in order to provide adjustments in height and friction. Some examples of different implementations include more than one extendable portion, the height adjusting unit extending through a holey layer, the fixed or extendable portion being rotatable in a clockwise or counter clockwise in relation to an axis that extends substantially along a longitudinal axis of the height adjusting unit, and so forth.

In one or more implementations, the height adjusting units 202 may be also configured with pressure sensing functionality to detect how much, if any, pressure is applied to the plurality of height adjusting units 202. For example, one or more of the height adjusting units 202 may house pressure sensors. The controller 112 may use the sensor data 122 obtained using the pressure sensing functionality to determine position and movement of the user 107 on the variable height terrain surface 104. If pressure is applied to a height adjusting unit 202, for instance, the sensor data 122 generated using the pressure sensing functionality is communicated to the movement sensing module 120. Based on this pressure data, the movement sensing module 120 determines a current position of the user 107. The sensor data 122 indicating pressure applied to this and other height adjusting units 202 may also be used to determine a speed at which the user 107 moves on variable height terrain surface 104. Pressure data may be used in conjunction with the sensor data 122 obtained from other types of sensors, e.g., cameras, proximity sensors, thermal sensors, accelerometers, and so forth.

Figure 3:
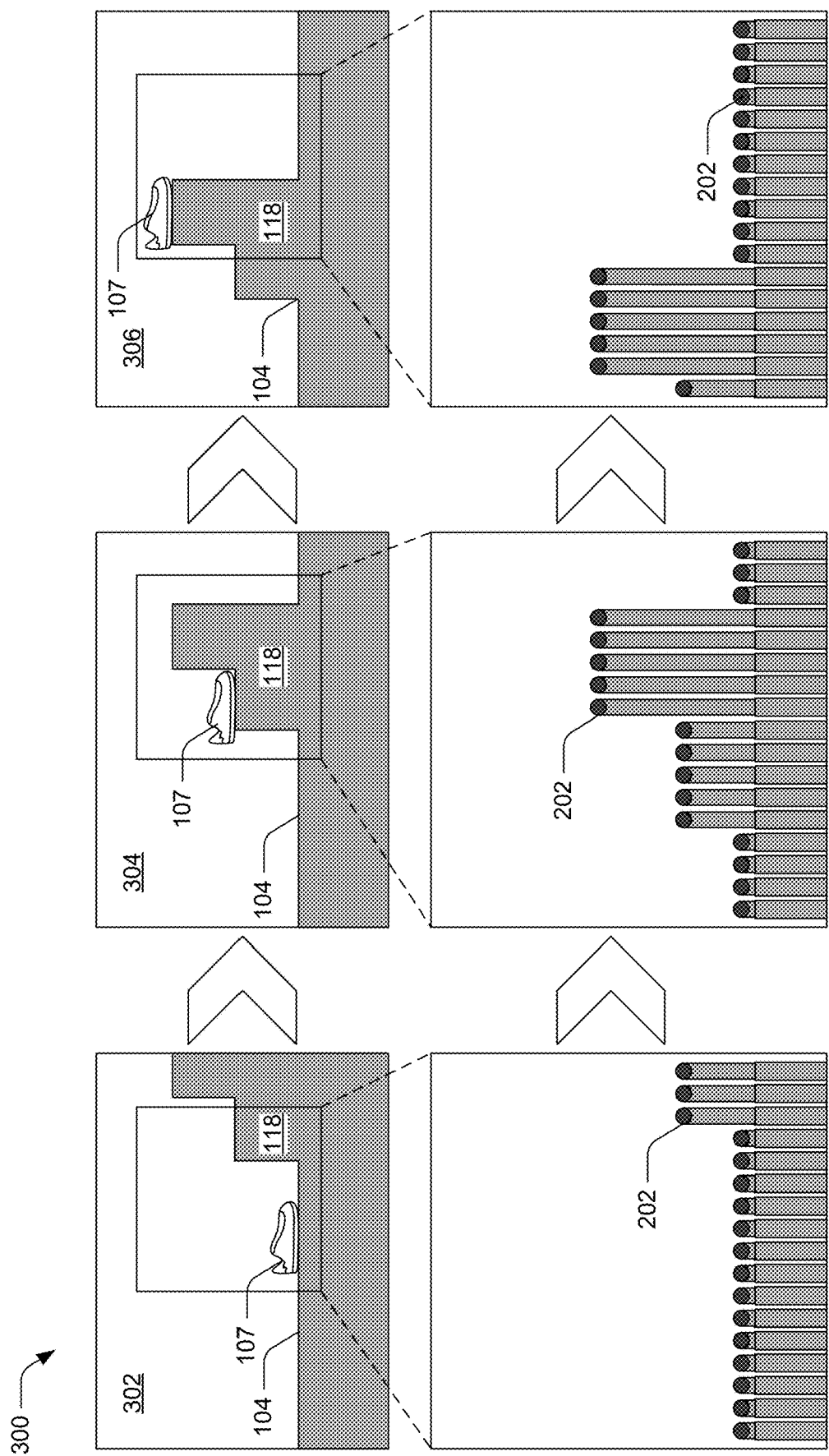
FIG. 3 depicts a side view progression of a user moving on the variable height terrain surface.

FIG. 3 depicts a side view progression 300 of a user moving on the variable height terrain surface. The example side view progression 300 is illustrated at three different stages, including stages 302, 304, 306.

At stage 302, the user 107 is depicted walking toward the terrain element 118 of the variable height terrain surface 104. In this example, the terrain element 118 is depicted as a set of two stairs.

At 302, user 107 is shown to be stepping on a portion of height adjusting units 202 just before the terrain element 118. The close-up view at stage 302 illustrates a plurality of the height adjusting units 202 proximate the user's 107 foot (not shown in the close-up). This close up view 302 depicts a majority of the height adjusting units 202 on a left-hand side of the close-up view at a fully retracted position while the three rightmost height adjusting units 202 are depicted partially extended to form a portion of a first step of a set of stairs.

At 304, the variable height terrain surface 104 is shown adjusted as the user 107 moves toward the terrain element 118. In this, case the user 107 is shown stepping on the height adjusting units 202 extended to form the first stair of the terrain element 118. Note that the height adjusting units 202 which were shown as extended at stage 302 are shown fully retracted in the close-up at stage 304, while a different group of the height adjusting units 202 are shown extended forming the first stair of the set of stairs. Additionally, a further group of the height adjusting units 202 are shown extended to a greater height forming the second stair of the set of stairs.

The side view progression 300 thus shows that the height adjusting units 202 retract and extend to simulate the terrain element 118 moving through the variable height terrain surface 104. Although it may appear that the terrain element 118 is moving throughout the variable height terrain surface 104, as discussed above, the height adjusting units 202 have a stationary position, e.g., fixed to a layer of the variable height terrain surface. Thus rather than the height adjusting units 202 moving toward the user 107, the height adjusting units 202 are instead continuously retracting and extending according to the terrain data 116 and the sensor data 122.

At 306, the variable height terrain surface 104 is shown further adjusted (e.g., from the stage 304) as the user moves over the terrain element 118. In this case, the user is shown stepping on different height adjusting units 202 extended to form the second stair of the terrain element 118. Notably, the height adjusting units 202 depicted forming the second stair at stage 306 are different than the height adjusting units depicted forming the second stair at stage 304 and include some of the height adjusting units 202 depicted forming the first stair at stage 304. Moreover, some of the height adjusting units 202 shown forming the second stair at stage 304 are depicted as fully retracted in the stage 306.

Figure 4:
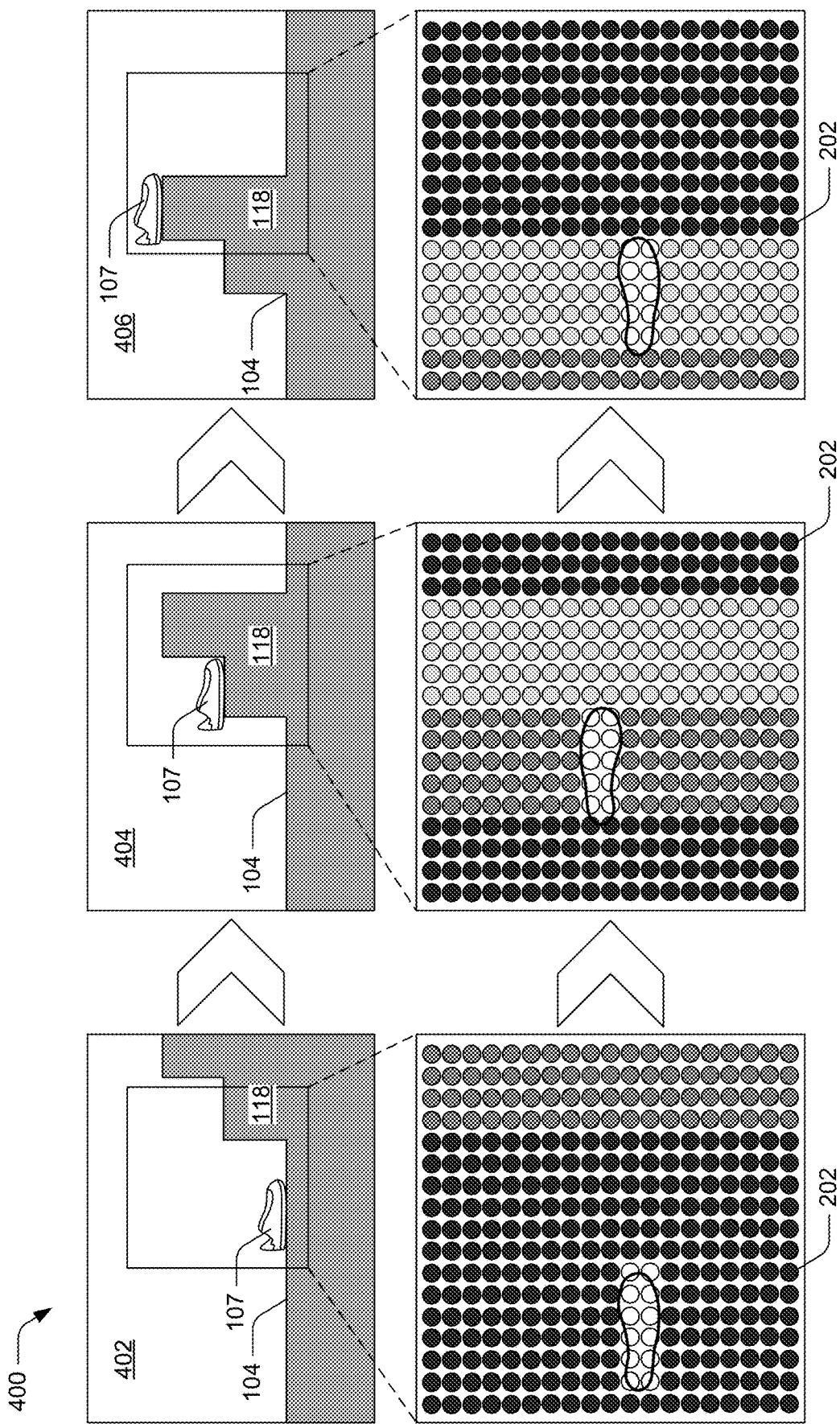
FIG. 4 depicts a top view progression of a user moving on the variable height terrain surface.

FIG. 4 depicts a top view progression 400 of a user moving on the variable height terrain surface. The example top view progression 400 is illustrated at three different stages, including stages 402, 404, 406, which correspond to stages 302, 304, 306 of FIG. 3, respectively.

In this example, the close-up views of the different stages 402, 404, 406 depict the height adjusting units 202 with different shades to indicate different heights at which the different height adjusting units 202 are deployed. For example, the darkest shade of grey depicts the height adjusting units 202 at a fully retracted position, the second darkest shade of grey depicts the height adjusting units 202 at a lower extended position forming a first stair of the set of stairs, and the lightest shade of grey depicts the height adjusting units 202 at a higher extended position forming the second stair of the set of stairs. Additionally, the height adjusting units 202 depicted in white represent the height adjusting units 202 having sensors that sense pressure corresponding to the user 107's foot.

Figure 5:
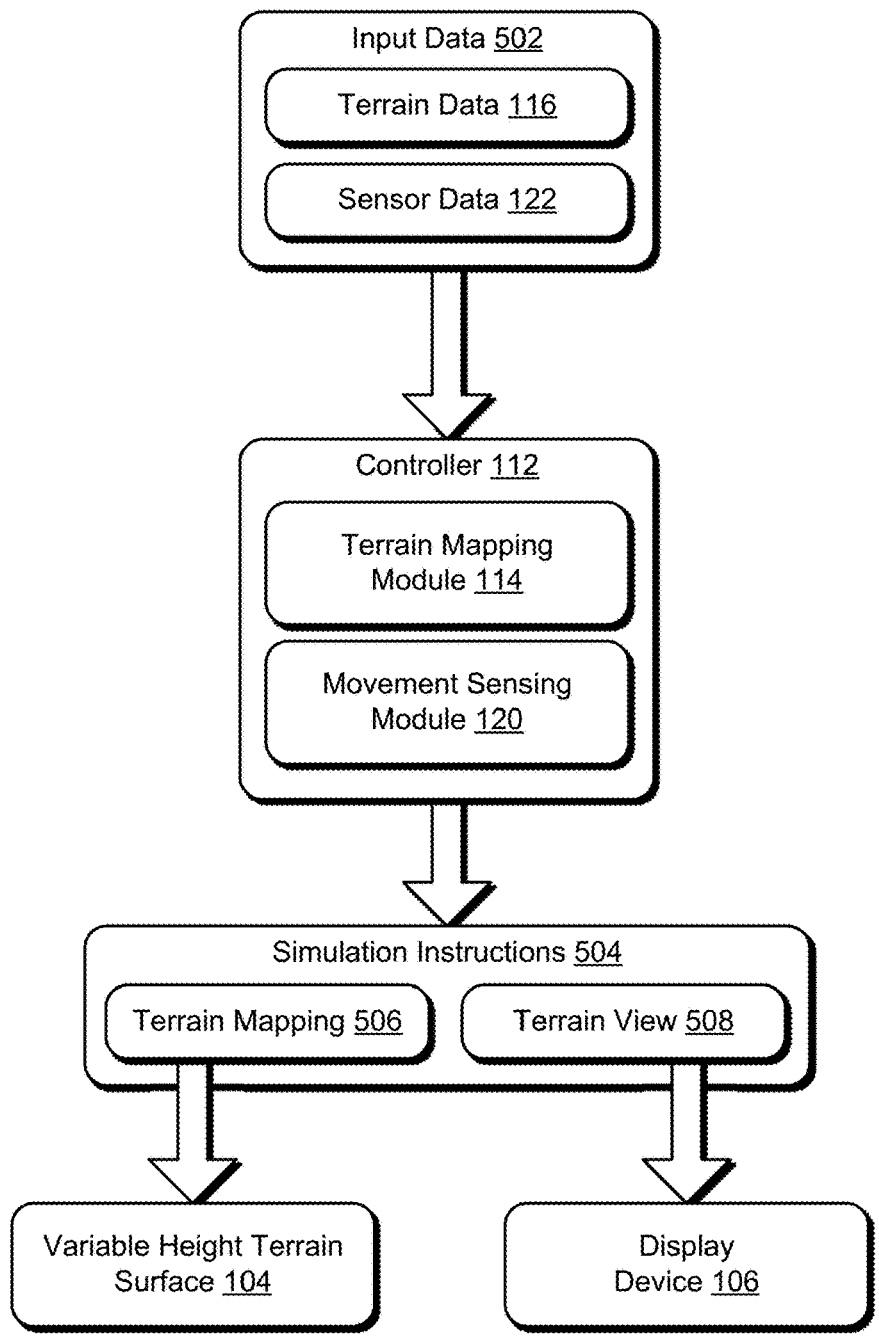
FIG. 5 depicts an example implementation in which a controller system of generates simulation instructions to control the variable height terrain surface and the display device.

FIG. 5 depicts an example implementation 500 in which a controller system of FIG. 1 generates simulation instructions to control the variable height terrain surface 104 and the display device 106. The illustrated example 500 includes from FIG. 1, the controller 112, the variable height terrain surface 104, and the display device 106.

The controller 112 obtains input data 502. The input data 502 includes the terrain data 116 and the sensor data 122. As discussed above, the terrain data 116 describes a terrain that is to be simulated, e.g., terrain of a real-world environment or a fictional environment. In some cases, the user 107 may select from a plurality of "maps" having an associated terrain described by the terrain data 116. As further discussed above, the sensor data 122 may describe the position and movement of the user 107 on the variable height terrain surface 104. The sensor data 122 may be received from sensors housed in the plurality of height adjusting units 202 and/or the sensors 108, e.g., proximity sensors, cameras, and so forth.

The controller 112 leverages the above-discussed functionality of the terrain mapping module 114 and the movement sensing module 120 to generate simulation instructions 504. In particular, the terrain mapping module 114 maps the terrain described by the terrain data 116 to the height adjusting a units 202 of the variable height terrain surface 104. Based on this terrain mapping as well as a location of the user determined by the movement sensing module 120, the terrain mapping module 114 generates the terrain mapping 506 to describe which of the height adjusting units are extended or retracted and how their friction elements 214 rotate. The terrain mapping module 114 also determines the terrain view 508, which describes portions of the virtual environment to display via the device 106 to synchronize the visual experience with the physical experience provided by the variable height terrain surface 104. As illustrated, the terrain mapping 510 is used to control the physical aspects of the simulation provided by the variable height terrain surface and the terrain view is used to control visual aspects of the simulation provided by the display device 106.

Notably, as the user 107 continues to move through the terrain, the sensor data 122 describing the movement and the position of the user 107 within the variable height terrain surface 104, is continually received by the controller 112. As such, new simulation instructions 504 are continually output to the variable height terrain surface 104 and the display device 106 based on the sensor data 122 and the terrain data 116.

Example Procedure

The following discussion describes an example procedure for the variable height terrain surface 104 in accordance with one or more embodiments. The example procedures may be employed in the environment 100 of FIG. 1, the system 700 of FIG. 7, and/or any other suitable environment. Further, the example procedures may represent implementations of aspects of the example implementation scenario discussed above. In at least some implementations, steps described for the various procedures can be implemented automatically and independent of user interaction.

Figure 6:
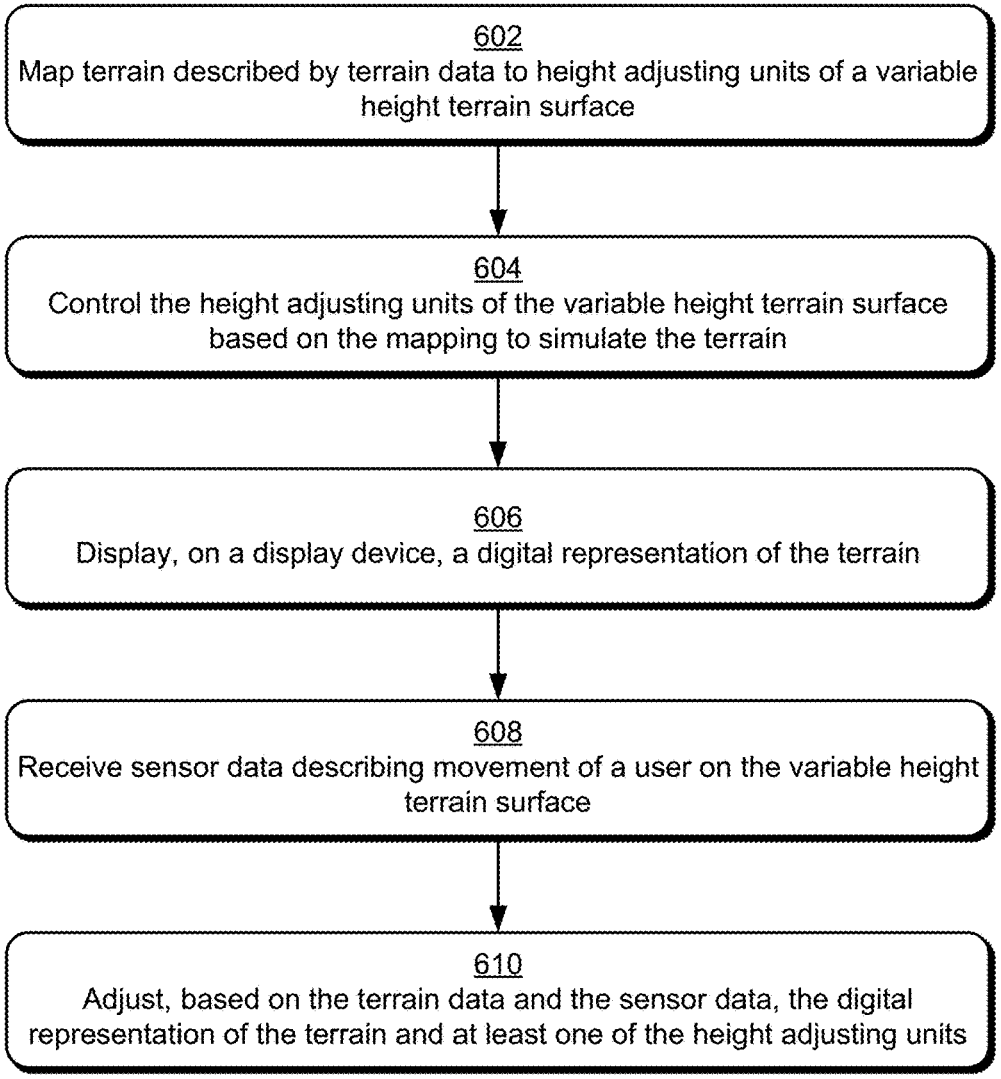
FIG. 6 is a flow diagram depicting a procedure in an example implementation in which a digital visual representation of a terrain and height adjusting units of a variable height terrain surface are adjusted to synchronize a physical experience of a virtual world with a visual experience of the virtual world.

FIG. 6 is a flow diagram depicting a procedure 600 in an example implementation in which a digital visual representation of a terrain and height adjusting units of a variable height terrain surface are adjusted to synchronize a physical experience of a virtual world with a visual experience of the virtual world.

Terrain described by terrain data is mapped to height adjusting units of a variable height terrain surface (block 602). By way of example, the terrain mapping module 114 maps terrain described by the terrain data 116 to the height adjusting units 202 of the variable height terrain surface 104. Based on this mapping, the terrain mapping module 114 generates the terrain mapping 506.

The height adjusting units of the variable height terrain surface are controlled based on the mapping to simulate the terrain (block 604). By way of example, the controller 112 controls the height adjusting units 202 of the variable height terrain surface 104 in accordance with the terrain mapping 506 to simulate the terrain described by the terrain data 116.

A digital representation of the terrain is displayed via a display device (block 606). By way of example, the display device 106 displays the terrain view 508, which is a digital representation of the terrain described by the terrain data 116 and is synchronized with the terrain mapping 506.

Sensor data is received that describes movement of a user on the variable height terrain surface (block 608). By way of example, the controller 112 receives the sensor data 122 from the sensors 108. In accordance with the principles discussed herein, the controller 112 also receives the sensor data 122 from sensors housed in the variable height terrain surface 104. For example, this sensor data 122 describes, at least in part, movement of the user 107 on the variable height terrain surface 104.

The digital representation of the terrain and at least one of the height adjusting units are adjusted based on the terrain data and the sensor data (block 610). By way of example, the controller 112 adjusts the terrain view 508 for display via the display device 106 and also leverages functionality of the terrain mapping module to adjust at least one of the height adjusting units 202 of the variable height terrain surface 104 based on the terrain data 116 and the sensor data 122. In particular, the controller 112 causes the terrain view 508 and the terrain mapping 506—and thus which of the height adjusting units 202 are extended and by how much—to be adjusted in real-time as the user 107 moves on the variable height terrain surface 104. This is effective to simulate both physical and visual aspects of a virtual world in synchronization—eliminating disconnect between physical and virtual experiences which occurs with conventional surface-simulating systems.

Having discussed an example procedure, consider now a discussion of an example system and device in accordance with one or more embodiments.

Example System and Device

Figure 7:
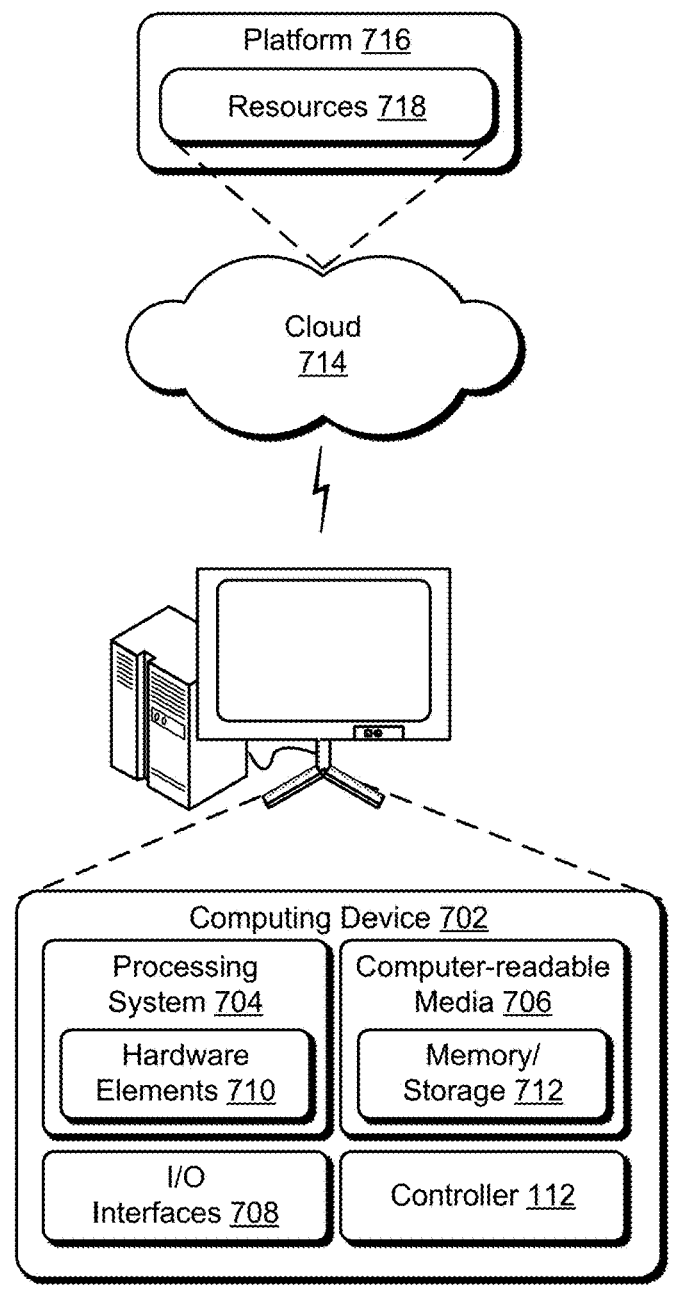
FIG. 7 illustrates an example system that includes an example computing device that is representative of one or more computing systems and/or devices that may implement the various techniques described herein.

FIG. 7 illustrates an example system generally at 700 that includes an example computing device 702 that is representative of one or more computing systems and/or devices that may implement the various techniques described herein. This is illustrated through inclusion of the controller 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   a variable height terrain surface having a plurality of height adjusting units that are arranged in a grid and are individually adjustable, each height adjusting unit comprising;
      a fixed portion secured to a layer of the variable height terrain surface and an extendable portion that is vertically extendable and retractable from the fixed portion; and
      a rotatable friction element disposed at an extendable end of the extendable portion of the piston element.

2. The system as recited in claim 1, wherein the variable height terrain surface enables a user to walk or run omni-directionally on the variable height terrain surface.

3. The system as recited in claim 1, wherein the rotatable friction elements of the plurality of height adjusting units are configured to rotate responsive to movement of a user on the variable height terrain surface, the movement corresponding to the user walking or running on the variable height terrain surface.

4. The system as recited in claim 3, wherein the rotatable friction elements are configured to rotate in a direction that is at least partially opposite to the movement of the user on the variable height terrain surface.

5. The system as recited in claim 4, wherein the rotation of the rotatable friction elements in the direction that is at least partially opposite to the movement of the user maintains the user within a predefined distance from a center of the variable height terrain surface.

6. The system as recited in claim 1, wherein the plurality of height adjusting units are configured to adjust to different heights to simulate a terrain.

7. The system as recited in claim 1, wherein the rotatable friction elements are configured to increase or decrease rotatability to simulate characteristics of a terrain.

8. The system as recited in claim 1, wherein at least one of the fixed portion or the extendable portion of the plurality of height adjusting units are configured to rotate.

9. The system as recited in claim 1, further comprising a display device that displays a view of a terrain simulated by the variable height terrain surface.

10. The system as recited in claim 9, wherein the display device is configured to change the view of the terrain responsive to movement by a user on the variable height terrain surface.

11. The system as recited in claim 10, wherein the plurality of height adjusting units are configured to adjust to simulate the terrain as the view of the terrain displayed by the display device changes.

12. A method comprising:
   mapping terrain described by terrain data to a variable height terrain surface comprising a plurality of height adjusting units arranged in a grid, the plurality of height adjusting units comprising a rotatable friction element disposed at an extendable end of each respective height adjusting unit;
   controlling the height adjusting units of the variable height terrain surface based on the mapping to simulate the terrain;
   displaying, on a display device, a digital representation of the terrain;
   receiving sensor data describing movement of a user on the variable height terrain surface, the movement corresponding to the user walking or running on the variable height terrain surface; and
   adjusting, based on the terrain data and the sensor data, the digital representation of the terrain and at least one of the height adjusting units.

13. The method as recited in claim 12, wherein the sensor data comprises image data of the user on the variable height terrain surface captured by one or more cameras.

14. The method as recited in claim 12, wherein the sensor data comprises pressure data of the user on the variable height terrain surface captured by one or more pressure sensors of the variable height terrain surface.

15. The method as recited in claim 12, wherein the adjusting further comprises adjusting a height of the at least one height adjusting unit by controlling the at least one height adjusting unit to extend or retract.

16. The method as recited in claim 12, wherein the adjusting further comprises adjusting a friction associated with at least one height adjusting unit via the rotatable friction element.

17. A system comprising:
   a virtual reality (VR) display device configured to render a view of a virtual environment having a terrain;
   a variable height terrain surface comprising a plurality of height adjusting units arranged in a grid, the plurality of height adjusting units comprising a rotatable friction element disposed at an extendable end of each respective height adjusting unit;
   a controller configured to:
      determine a change of position within the virtual environment in response to movement of a user on the variable height terrain surface;
      control the VR display device to render a different view of the virtual environment having a changed terrain based on the change of position within the virtual environment; and
      control the variable height terrain surface to adjust to simulate the changed terrain based on the change of position within the virtual environment.

18. The system as recited in claim 17, wherein the controller is further configured to control the variable height terrain surface to adjust to simulate the changed terrain by adjusting a height of at least one of the plurality of height adjusting units.

19. The system as recited in claim 17, wherein the movement of the user corresponds to the user walking or running on the variable height terrain surface.

20. The system as recited in claim 17, wherein the controller is further configured to control the variable height terrain surface to adjust to simulate the changed terrain by adjusting a friction of at least one of the rotatable friction elements.

* * * * *